United States Patent [19]
Keck

[11] 3,898,196

[45] Aug. 5, 1975

[54] COPOLYESTERS OF FLUORINE CONTAINING ALIPHATIC DICARBOXYLIC ACIDS

[75] Inventor: Max H. Keck, Cuyahoga Falls, Ohio

[73] Assignee: The Goodyear Tire & Rubber Company, Akron, Ohio

[22] Filed: Feb. 14, 1974

[21] Appl. No.: 442,542

[52] U.S. Cl. .......................... 260/75 H; 117/138.8 F
[51] Int. Cl. ............................................. C08g 17/08
[58] Field of Search ................................. 260/75 H

[56] References Cited
UNITED STATES PATENTS

| | | | |
|---|---|---|---|
| 2,585,827 | 2/1952 | Padbury et al. | 260/22 |
| 2,806,865 | 9/1957 | Barnhart et al. | 260/408 |
| 3,248,419 | 4/1966 | Hauptschein et al. | 260/487 |
| 3,525,678 | 8/1970 | Kim et al. | 204/158 |

*Primary Examiner*—Melvin Goldstein
*Assistant Examiner*—Natalia Harkaway
*Attorney, Agent, or Firm*—F. W. Brunner; J. M. Wallace, Jr.

[57] ABSTRACT

Copolyesters of an aliphatic glycol, terephthalic acid and from about 1 to about 20 mol percent of a fluorinated aliphatic dicarboxylic acid. Fibers of the copolyesters have improved soil resistance and soil release properties.

6 Claims, No Drawings

COPOLYESTERS OF FLUORINE CONTAINING ALIPHATIC DICARBOXYLIC ACIDS

This invention relates to new copolyesters and to products prepared therefrom.

According to the invention a new type of copolyester has been discovered. The copolyesters have properties that are different from ethylene terephthalate and are improved with respect to soil resistance, soil release, stain resistance and resistance to burning. The copolyesters also have improved resistance to damage from chemical agents.

The copolyesters of the invention are copolyesters of a polymethylene glycol of the general formula HO-$(CH_2)_n$OH in which $n$ is an integer from 2 to 6, terephthalic acid and from 1 to 20 mol percent of the total mols of acid units in the copolyester are units of an aliphatic dicarboxylic acid, said aliphatic acid containing at least about 35 percent by weight of fluorine. The copolyesters of the invention contain from about 1 to 20 mol percent of the fluorine-containing aliphatic dicarboxylic acid. They are prepared by ester interchange and condensation, by esterification of the glycol with the acids and condensation of the glycol esters and by reacting the glycol ester of terephthalic acid with the aliphatic dicarboxylic acid containing fluorine followed by condensation.

Representative examples of glycols of the invention are ethylene glycol, propylene glycol, the butylene glycols, pentamethylene glycols and hexamethylene glycols. Representative examples of fluorine-containing aliphatic dicarboxylic acids are perfluorosuccinic acid, hexafluoro-glutaric acid, octafluoroadipic acid, dodecafluorosuberic acid, octadecafluoroundecanedioic acid, tetracosafluorotetradecanedioic acid, 3,5-dichloro-2,2,3,4,4,5,6,6-octa fluoroheptanedioic acid and 3,5,7-trichloro-2,2,3,4,4,5,6,6,7,8,8-undecafluorononanedioic acid.

The copolyesters of the invention can contain the units in various ratios. Thus, as noted, they can contain the glycol terephthalate and the glycol fluorinated aliphatic dicarboxylate in the range of from 99/1 to 80/20. The 95/5, 90/10 and 85/15 copolyesters are useful also as soil resistant materials. Among the preferred copolyesters are the ethylene terephthalate-ethylene hexafluoroglutarate copolyesters in which the ethylene terephthalate units comprise from 99 to 80 percent of the sum of the ethylene terephthalate and ethylene hexafluoroglutarate units in the copolyesters and the ethylene hexafluoroglutarate units comprise from 1 to 20 percent of said sum; and the ethylene terephthalate-ethylene octafluoroadipate copolyesters in which the ethylene terephthalate units comprise from 99 to 80 percent of the sum of the ethylene terephthalate and ethylene octafluoroadipate units in the copolyester and the ethylene octafluoroadipate units comprise from 1 to 20 percent of said sum. The copolyesters containing from 90/10 to 99/1 of said units are preferred for use in forming soil resistant fibers. Especially preferred are the 95/5 ethylene terephthalate-ethylene hexafluoroglutarate copolymers and the 95/5 ethylene terephthalate-ethylene octafluoroadipate copolyesters.

The naphthalic acids also form useful copolyesters with the fluorinated aliphatic dicarboxylic acids in the range of 99/1 to 80/20 ratio of naphthalic acid units to fluorinated aliphatic acid units. The 95/5, 90/10 and 85/15 copolyesters are preferred. The ethylene glycol polyesters are most preferred with hexafluoroglutaric acid and octafluoroadipic acids being the preferred acids.

If desired, the copolyesters can be modified with up to 10 mol percent of another acid, an aromatic aliphatic acid such as isophthalic acid or bibenzoic acid, or an aliphatic acid such as adipic acid or sebacic acid.

The following examples illustrate the invention.

EXAMPLE 1

Preparation of a 97.5/2.5 Ethylene Terephthalate/Hexafluoroglutarate Copolyester Into a three necked flask fitted with stirrer, thermometer, nitrogen inlet tube and distillation side arm were charged 340.4 grams of dimethyl terephthalate (1.75 mols), 275 grams of ethylene glycol (4.14 mols), 0.10 gram of manganese acetate and 0.10 gram of antimony trioxide. This mixture was heated and stirred for 3.5 hours during which time the batch temperature rose from 150° to 207° C. and 132 milliliters of methanol distilled from the mixture. At this point 10.8 grams of hexafluoroglutaric acid (0.045 mol) were added. Heating and stirring were continued for four hours at 200° to 215° C. after which the batch was transferred to a 1 liter polymerization reactor equipped with stirrer, thermocouple well, nitrogen inlet and vacuum outlet. The temperature was raised from 225° to 270° C. over a 1 hour period during which time nitrogen gas was slowly passed through the mixture and the pressure was gradually reduced to 0.8 Torr. During the next ½ hour the batch temperature was raised from 270° to 276° C. and the pressure of 0.8 Torr was maintained. An appreciable increase in melt viscosity was observed. The reactor system was restored to atmospheric pressure by addition of nitrogen gas. The pale yellow polymer was extruded into a Teflon coated tray. The intrinsic viscosity of the polymer was found to be 0.513 and the carboxyl number was 2. The DTA melting point of an annealed sample of copolymer was 233.5° C.

EXAMPLE 2

Preparation of 95/5 Ethylene Terephthalate/Hexafluoroglutarate Copolyester

In the same manner as is described in Example 1 were reacted 368.4 grams of dimethyl terephthalate, 24.0 grams of hexafluoroglutaric acid and 286 grams of ethylene glycol, using as catalyst 0.11 gram manganese acetate, and 0.11 gram of antimony trioxide. The resulting pale yellow polymer had an intrinsic viscosity of 0.552 and a carboxyl number of 8.

The DTA melting point of this copolyester was 225.5° C. The copolyesters of Examples 1 and 2 were spun into yarn, drawn and heat set. Characterization data are presented in Table I.

TABLE I

| Fiber Properties of Copolyesters with Hexafluoroglutaric Acid | | |
|---|---|---|
| | 97.5/2.5 Ethylene Tere/HFGL* | 95/5 Ethylene Tere/HFGL* |
| Denier | 167 | 95 |
| Tensile | 1.13 | .77 |
| Tenacity (g/d) | 3.07 | 3.68 |
| Elongation (%) | 44.4 | 11.3 |

*Ethylene Terephthalate/Hexafluoroglutarate

EXAMPLE 3

Preparation of a 90/10 Ethylene Terephthalate/Hexafluoroglutarate Copolymer

A mixture of 52.38 grams dimethyl terephthalate, 43 milliliters of ethylene glycol, 0.015 gram of manganese acetate and 0.015 gram of antimony trioxide was placed in a glass reaction tube equipped with a stirrer and a side arm with condenser. This mixture was heated and stirred at 200° C. for 3 hours during which time 20.5 milliliters of methanol distilled out. The reaction mixture was cooled to 150° C. and a 7.2 gram quantity of hexafluoroglutaric acid was added. The reaction mixture was then heated at 210° C. with stirring for 15 minutes. The reaction temperature was gradually increased to 250° C. over a 45 minute period. When the temperature reached 250° C. a gradual reduction of pressure was initiated. At the end of 15 minutes the pressure had been reduced to 0.3 Torr. The temperature was increased to 265° C. and the reaction was continued for 1¾ hours during which time the melt viscosity increased considerably. The condensation reaction was terminated at this point and fibers were pulled from the melt. The intrinsic viscosity of the polymer was 0.430 and an annealed sample had a DTA melting point of 205° C. This 90/10 copolymer was found to be soluble in hot dioxane and 1,1,2-trichloroethane.

EXAMPLE 4

Preparation of 80/20 Ethylene Terephthalate/Hexafluoroglutarate

In the same manner as described in Example 3 were reacted 34.1 grams of dimethyl terephthalate, 32 milliliters of ethylene glycol, 0.0102 gram of manganese acetate and 0.0102 gram of antimony trioxide. When 12.5 milliliters of methanol had distilled from the reaction mixture 10.56 grams of hexafluoroglutaric acid were added. The reaction was continued as described in Example 3. The reaction mixture was heated at 250° C. and 0.3 Torr until the melt viscosity was quite high. The resulting polymer was light yellow. Fibers could be pulled from the melt. The intrinsic viscosity was 0.423. This copolymer was soluble in hot dioxane and 1,1,2-trichloroethane.

EXAMPLE 5

Preparation of a 95/5 Ethylene Terephthalate/Octafluoroadipate Copolymer

In the same manner as described in Example 3 were reacted 46 grams of dimethyl terephthalate, 36 milliliters of ethylene glycol, 0.0138 gram of manganese acetate and 0.0138 gram of antimony trioxide. When 18 milliliters of methanol had distilled from the mixture, 4.07 grams of octafluoroadipic acid dihydrate were added. The reaction was then continued as described in Example 3. After being heated at 265° C. for 1½ hours at 0.2 Torr the polymer melt was extremely viscous. The color of the polymer melt was clear and light yellow. The reaction was terminated and fibers were drawn from the melt by means of a glass rod. These fibers on being oriented to about a 4:1 draw ratio at 70° C. were found to be very strong.

The intrinsic viscosity of this polymer was found to be 0.417.

Soil Release Testing

Samples of a standard polyethylene terephthalate yarn and of a yarn from the 95/5 ethylene terephthalate/hexafluoroglutarate copolymer were each knitted into a 2 foot length of tube or "sock".

Eight inch long socks of each of the polymer compositions were then separately immersed for 30 seconds into old dirty motor oil. The socks were lifted out and allowed to drain for 2 to 3 minutes. As much excess oil as possible was removed by repeated pressings between fresh paper towels. When only a light oil stain could be made to come off on the towels the two samples were dropped into separate beakers each containing 200 milliliters of a 5 percent by weight solution of Triton X-100. The socks were stirred for 30 minutes at 70° C. after which the detergent was rinsed off with fresh water. A second 10 minute detergent wash was then applied after which the samples were again rinsed with fresh water. Both samples were still highly stained after these two washings. Each sock was then washed for 10 minutes in warm (50° C.) heptane. The heptane was decanted off and a second heptane treatment was applied as before. The samples were dried at 50° C., washed once more in 5 percent Triton X-100 solution in water, rinsed in fresh water and dried at 50° C. The "whiteness" as read on a Gardner Color Meter was determined on knitted socks of each of the two polymers before soiling and after the soiling and washing treatment. Data are as follows:

| | |
|---|---|
| Rd value of standard polyester fiber before soiling | 76.8 |
| Rd value of fluorine-containing polyester fiber before soiling | 77.3 |
| Rd value of standard polyester after soiling and cleaning operation | 26.0 |
| Rd value of fluorine-containing polyester after soiling and cleaning operation | 45.3 |

(The higher the Rd number the greater the degree of "whiteness".) Thus the fluorine-containing polyester was much more soil resistant than the standard polyester.

A knitted sock was made of ethylene terephthalate homopolymer yarn. One portion of the sock was dipped in a 2 percent by weight solution of a 90/10 ethylene terephthalate/hexafluoroglutarate copolymer in 1,1,2-trichloroethane. The sock was removed from the solution, dried and heat treated to promote crystallization of the coating with the base polymer of ethylene terephthalate. The coated fabric was found to be much more soil resistant than the control that was not coated. The coated fabric also was softer and had better hand and drape than the uncoated fabric.

Other fabrics such as acrylic and nylon fabrics can be made soil resistant by coating them with a polyester of this invention. Other copolyesters of the invention can be used as soil resistant coatings. These copolyesters can contain from 5 to 30 mol percent of acid units derived from fluoro acids of this invention.

While certain representative embodiments and details have been shown for the purpose of illustrating the invention it will be apparent to those skilled in this art that various changes and modifications may be made therein without departing from the spirit or scope of the invention.

What I claim is:

1. A fiber-forming copolyester of units of a glycol of the formula $HO(CH_2)_nOH$ in which $n$ is an integer of from 2 to 6, units of terephthalic acid and from 1 to 20 mol percent of the total mols of acid units in the copolyester of units of a fluorine-containing aliphatic dicarboxylic acid selected from the group consisting of perfluorosuccinic acid, hexafluoroglutaric acid, octafluoroadipic acid, dodecafluorosuberic acid, octadecafluoroundecanedioic acid, tetracosafluorotetradecanedioic acid, 3,5-dichloro-2,2,3,4,4,5,6,6-octafluoroheptanedioic acid and 3,5,7-trichloro-2,2,3,4,4,5, 6,6,7,8,8-undecafluorononanedioic acid.

2. A fiber-forming copolyester of ethylene glycol, terephthalic acid and a fluorine-containing acid selected from the group consisting of hexafluoroglutaric acid, octafluoroadipic acid, perfluorosuccinic acid and dodecafluorosuberic acid in which the terephthalic acid units comprise from 99 to 80 percent of the acid units in the copolyester.

3. An ethylene terephthalate-ethylene hexafluoroglutarate fiber-forming copolyester in which the ethylene terephthalate units comprise from 99 to 80 percent of the sum of ethylene terephthalate and ethylene hexafluoroglutarate units in the copolyester, and the ethylene hexafluoroglutarate units comprise from 1 to 20 percent of said sum.

4. An ethylene terephthalate-ethylene octafluoroadipate fiber-forming copolyester in which the ethylene terephthalate units comprise from 99 to 80 percent of the sum of the ethylene terephthalate and ethylene octafluoroadipate units in the copolyester, and the ethylene octafluoroadipate units comprise from 1 to 20 percent of said sum.

5. A copolyester according to claim 1 in the form of a fiber.

6. A fabric having improved soil and stain resistance made of a fiber of claim 5.

* * * * *